(12) United States Patent
Nilsson et al.

(10) Patent No.: US 11,757,283 B2
(45) Date of Patent: Sep. 12, 2023

(54) METHOD AND SYSTEM FOR DC VOLTAGE SUPPLY OF PULSATING LOADS

(71) Applicant: SAAB AB, Linköping (SE)

(72) Inventors: Valter Nilsson, Hovås (SE); Theodor Hassiakis, Hisings Backa (SE); Ola Bååth, Gothenburg (SE)

(73) Assignee: SAAB AB, Linköping (SE)

( * ) Notice: Subject to any disclaimer, the term of this patent is extended or adjusted under 35 U.S.C. 154(b) by 76 days.

(21) Appl. No.: 17/621,390

(22) PCT Filed: Jun. 28, 2019

(86) PCT No.: PCT/SE2019/050639
§ 371 (c)(1),
(2) Date: Dec. 21, 2021

(87) PCT Pub. No.: WO2020/263143
PCT Pub. Date: Dec. 30, 2020

(65) Prior Publication Data
US 2022/0360074 A1 Nov. 10, 2022

(51) Int. Cl.
*H02J 1/06* (2006.01)
*H02J 7/34* (2006.01)
(52) U.S. Cl.
CPC .............. *H02J 1/06* (2013.01); *H02J 7/345* (2013.01); *H02J 2207/50* (2020.01)
(58) Field of Classification Search
CPC ........... H02J 1/06; H02J 7/345; H02J 2207/50
See application file for complete search history.

(56) References Cited

U.S. PATENT DOCUMENTS

| 5,045,712 A | 9/1991 | Baggenstoss |
| 5,274,539 A | 12/1993 | Steigerwald et al. |
| 5,945,941 A | 8/1999 | Rich, III et al. |
| 6,600,237 B1 | 7/2003 | Meissner |
| 7,656,141 B1 * | 2/2010 | Granat .................. H02M 3/158 323/284 |
| 2007/0090693 A1 | 4/2007 | Fox |

(Continued)

OTHER PUBLICATIONS

Extended European Search Report dated Mar. 24, 2023 for European Patent Application No. 19935660.1, 8 pages.

(Continued)

*Primary Examiner* — Carlos Amaya
(74) *Attorney, Agent, or Firm* — SAGE PATENT GROUP

(57) ABSTRACT

The invention relates to a method and a system for providing current from a DC power supply to pulsed loads in an array. The array comprises at least two electronic units. Each electronic unit comprises a regulator connected to an energy storage, to a pulsed load and to a charge control unit. The charge control unit is arranged to control the supply of DC current to the pulsed load connected to the electronic unit. The method comprises: selecting a pulse load pattern for the pulsed loads, selecting a charge control sequence by a control system connected to the electronic units and the DC power supply, starting the selected charge control sequence, starting the pulse load pattern, providing DC current from the DC power supply to each electronic unit at different times according to the selected charge control sequence set by the charge control unit.

14 Claims, 8 Drawing Sheets

(56) References Cited

U.S. PATENT DOCUMENTS

2017/0012524 A1   1/2017   Janehag et al.

OTHER PUBLICATIONS

International Search Report and Written Opinion dated Feb. 11, 2020 for International Application No. PCT/SE2019/050639, 12 pages.
International Preliminary Report on Patentability dated May 26, 2021 for International Application No. PCT/SE2019/050639, 12 pages.

* cited by examiner

METHOD AND SYSTEM FOR DC VOLTAGE SUPPLY OF PULSATING LOADS

CROSS-REFERENCE TO RELATED APPLICATIONS

This application is a 35 U.S.C § 371 national stage application for International Application No. PCT/SE2019/050639, entitled "METHOD AND SYSTEM FOR DC VOLTAGE SUPPLY OF PULSATING LOADS", filed on Jun. 28, 2019, the disclosures and contents of which are hereby incorporated by reference in their entireties.

TECHNICAL FIELD

The invention relates to a method for providing and a system arranged to provide DC current from a DC power supply to pulsed loads in an array of electronic units.

BACKGROUND ART

Switched electronic loads requiring high instantaneous power in relation to the average power are common in modern communication equipment. One example of a switched electronic load is a solid-state pulse radar transmitter. A pulse radar transmitter feeds an antenna with pulse modulated RF power. The pulsed operation reflects the input DC power in proportion to the shape of the output power.

State of the art radars has an array antenna including multiple transmitter amplifiers, each arranged to feed one or several antenna elements in the array.

The peak power ($P_{peak}$) is often much larger than the average power ($P_{average}$). A peak power of ten times the average power or more is common. The shape of the power envelope in respect to time is considered a square wave. The relation between peak and average power is then:

$$P_{average} = D * P_{peak}$$

where D is the duty cycle, which is the relation between peak power duration (tp) and the cycle time (T), i.e.

$$D = \frac{t_p}{T}$$

The DC voltage supply to the radar transmitter supplies the load with a pulsed current since the amplifier requires a fixed voltage to perform required output RF-power. The modulation of the output power is reflected on the current waveform, which consequently is a pulsed square wave shaped DC current. It is thus obvious that pulsed loads have a large impact on the design of the voltage supply.

Designing DC voltage supply systems for peak power results in over-sized systems, which require more physical space, are heavier and more expensive. Other aspects to consider are added distribution losses and risk for interference with other electronic equipment. Risks for mechanical wear in gearboxes related to generator systems due to pulsed electrical loads is another issue that might has to be considered.

SUMMARY OF THE INVENTION

An object of this disclosure is to provide an improved feeding of DC current to pulsed loads that addresses the problems described above. This object is achieved by a method for providing DC current from a DC power supply to pulsed loads in an array of electronic units, wherein the array comprises at least a first and a second electronic unit. Each electronic unit comprises a regulator connected to an energy storage and to a pulsed load, where the regulator is further connected to a charge control unit. The charge control unit is arranged to control the supply of DC current to the pulsed load connected to the electronic unit. The method comprises:
  selecting a pulse load pattern for the pulsed loads,
  selecting a charge control sequence by a control system connected to the electronic units and the DC power supply,
  instructing the charge control unit to start the charge control sequence,
  starting the pulse load pattern,
characterized in that the method comprises:
  providing DC current from the DC power supply to each electronic unit at different times according to the selected charge control sequence set by the charge control unit.

The pulsed load in each electronic unit is switched on typically for times shorter than a few milliseconds with a repetition rate ranging from hundreds of cycles per second to ten thousand cycles or more per second.

The pulsed load is according to one example, a transmitter amplifier feeding pulse modulated radio frequency (RF) power to an antenna or part of one or several antenna elements in an antenna array.

The pulsed operation of the transmitter amplifier reflects on the load applied on the DC power supply. At times when the transmitter amplifier is turned off, between the pulses, the transmitter amplifier has no substantial power consumption. When the transmitter is turned on, during the pulses, the demand for supply power raises to what is needed for the transmitter amplifier to perform required output.

By adapting previously known methods for providing DC current from the DC power supply to electronic units with the method step of providing each electronic unit at different times according to the selected charge control sequence set by the charge control unit, it is possible to reduce the design peak power that the system needs to be able to provide.

Further, a system using a method according to the disclosure can utilize smaller components. The system can thus be made less expensive and smaller.

The method may comprise:
  providing an output voltage via the regulator to an energy storage in each electronic unit, thereby charging the energy storage,
  feeding current pulses to said pulsed loads from said energy storage and/or the regulator.

Using an energy storage provides the system with the capability of being flexible in terms of being able to choose and control how the current pulses are fed to the pulsed loads. The regulator can also provide an output current when the pulsed loads for instance are electric motors.

The method may comprise:
  selecting the charge control sequence in which each regulator is provided DC current by an external control system.

An external control system may be used in which one or more pre-programmed charge control sequences can be stored and executed to control the feeding of current pulses to the regulators.

The method may comprise:
  selecting the charge control sequence in which each regulator is provided DC current by an internal control system in each electronic unit, with one internal control system functioning as a master control system.

As an alternative to an external control system, each electronic control unit may comprise its own control system in which one or more pre-programmed charge control sequences can be stored and executed to control the feeding of current pulses to the regulators. An internal control system in one of the electronic units, functioning as a master control system, provides instructions to the other internal control systems regarding which charge control sequence is to be used.

The method may comprise:
selecting a pre-programmed charge control sequence in which each regulator is provided DC current by the external or internal control system depending on the pulsed loads' current supply demand.

The external or internal control system may dynamically select a pre-programmed charge control sequence from all pre-programmed charge control sequences stored to match the pulsed loads' current supply demand. This allows the method to function for a wide range of current supply demands.

The method may comprise:
selecting a default charge control sequence in which each regulator is provided DC current by the external or internal control system depending on the pulsed loads' current supply demand,
measuring output DC current from the DC power supply,
analysing a waveform of the output DC current from the DC power supply by the external or internal control system,
calculating an adapted charge control sequence in which each regulator is provided DC current with a square waveform.

An adaptive method to find the best charge control sequence could be another possibility. The external or internal control system analyses the waveform of the output DC current from the DC power supply and calculates a new charge control sequence to make the supplied current to the regulators a pure DC current, i.e. a current with a square waveform.

The method may comprise:
providing DC current from the DC power supply to each electronic unit at different times according to the selected charge control sequence during one cycle time of the repetition rate for the pulsed load.

For pulsed loads that are operated with higher duty factors D or when a larger number of electronic units are supplied, the charge control sequence can interleave the current supply to the regulators between the electronic units to be able to fit a complete charge control sequence within the available cycle time.

The object of the disclosure is further achieved by a system arranged to feed DC current to an array of electronic units, wherein the system comprises:
at least a first and a second electronic unit arranged in an array,
where each electronic unit comprises a regulator connected to an energy storage and a pulsed load,
where the regulator is further connected to a charge control unit, where the charge control unit is arranged to provide a DC current to the pulsed load connected to the electronic unit, characterized in that the charge control units of the first and second electronic units are arranged to provide DC current from the DC power supply to each regulator in sequence.

A system according to the disclosure displays the same advantages as is provided by the above-described method.

Each charge control unit may be connected to an external control system arranged to select the charge control sequence in which each regulator is provided DC current.

Each charge control unit may be connected to an internal control system in each electronic unit, arranged to select the charge control sequence in which each regulator is provided DC current, with one internal control system functioning as a master control system.

The regulator may be a linear regulator, a switching regulator with a transformer, a switching regulator without a transformer or a combination of a switching regulator and a linear regulator.

Linear regulators might be preferred when a fast response is required and the input voltage only is slightly higher than the output voltage to keep losses sufficiently low. Switching regulators could on the other hand manage large differences between input and output voltages and still perform high power efficiencies. The regulator could also include both a switching regulator and a linear regulator.

The disclosure also relates to a system configured for performing the method steps as described above.

The disclosure also relates to a Radar antenna arrangement comprising a system according to the disclosure.

DETAILED DESCRIPTION

In the disclosure, with regulator is meant a voltage regulated power supply. The regulator can be a passive regulator or an active regulator. Examples of active regulators are linear regulators, switching regulators with a transformer, switching regulators without a transformer or combinations or hybrids of switching regulators and linear regulators.

Figure 1:
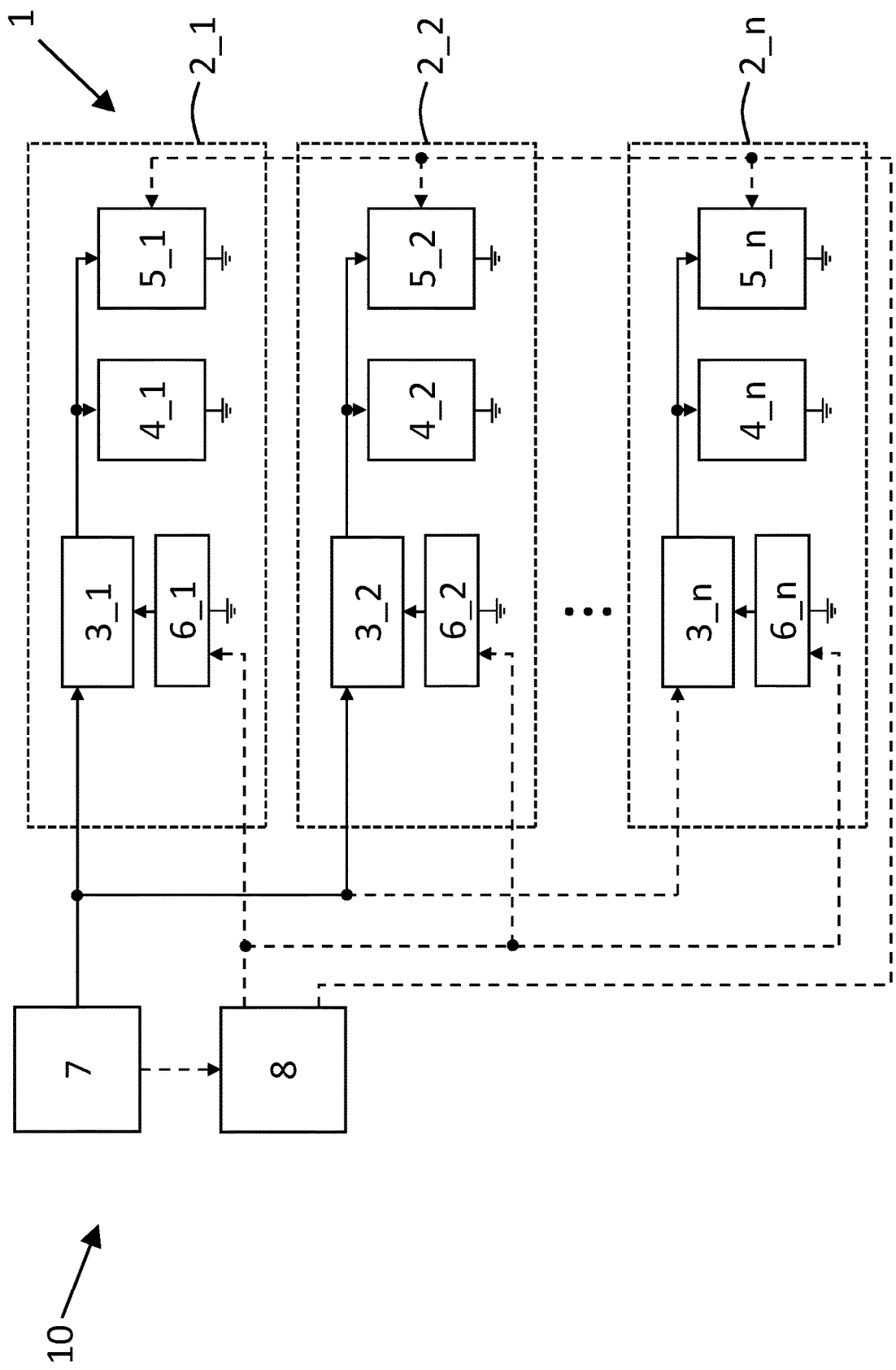
FIG. 1 schematically shows a circuit diagram for a system comprising an array of electronic units according to a first example embodiment, FIG. 2 schematically shows a diagram of current and voltage over time for a system with n electronic units, FIGS. 3a-3d schematically show a diagram of current over time in a system comprising 9 electronic units, FIG. 4 schematically show a diagram of current over time in a system where the current supplied is interleaved to fit within one duty cycle, FIG. 5 schematically shows a circuit diagram for a system comprising an array of electronic units according to a second example embodiment.

FIG. 1 schematically shows a circuit diagram for a system 10 comprising an array 1 of electronic units 2 according to a first example embodiment. The system 10 is arranged to feed DC current to the array 1. The method and system according to the disclosure works for arrays with as few as two electronic units 2 but can be scaled up to arrays with a large number of electronic units 2.

For a more comprehensive explanation of the method and system of the disclosure, an array 1 with n electronic units 2 will be discussed initially. The array 1 may consist of up to hundreds or more pulsed loads depending on the application. The loads are normally, but not necessarily, the same for each electronic unit 2.

The electronic units 2 and the components of each electronic unit 2 will be labelled with X_1, X_2, ..., X_n, where X is the reference number of the component, to separate the components in the various electronic units from each other. This will normally be shortened to X_1, X_2, X_n for brevity.

Normally, components with the same reference number are identical. In a practical implementation, the array 1 also can include different types of electronic units 2 where the components may differ from each other.

The array 1 of FIG. 1 comprises a first electronic unit 2_1, a second electronic unit 2_2 up to an nth electronic unit 2_n, where the dots between the second electronic unit 2_2 and the nth electronic unit 2_n indicates that more electronic units can be present there between.

Each electronic unit 2_1, 2_2, 2_n comprises a regulator 3_1, 3_2, 3_n connected to an energy storage 4_1, 4_2, 4_n and to a pulsed load 5_1, 5_2, 5_n, where the regulator 3_1, 3_2, 3_n is further connected to a charge control unit 6_1, 6_2, 6_n or comprises a charge control unit 6_1, 6_2, 6_n. A DC power supply 7 is connected to the regulator 3_1, 3_2, 3_n in each electronic unit 2_1, 2_2, 2_n. The regulator 3_1, 3_2, 3_n is arranged to regulate the voltage to the pulsed load 5_1, 5_2, 5_n and can also be used for shaping the current provided to the pulsed load 5_1, 5_2, 5_n. The regulator 3_1, 3_2, 3_n further controls the current to the energy storage 4_1, 4_2, 4_n. The energy storage 4_1, 4_2, 4_n normally comprises one or more capacitors and is well known in the art.

The pulsed loads 5_1, 5_2, 5_n in the electronic units 2_1, 2_2, 2_n are all synchronized to turn on and turn off simultaneously. In pulsed radars, where precise timing is important, the loads 5_1, 5_2, 5_n in the form of transmitters are most commonly controlled from an external control unit 8 but can also be controlled by internal control units. This will be described in more detail later.

In FIG. 1, an external control unit 8 is connected to the DC power supply 7 and to the charge control unit 6_1, 6_2, 6_n and pulsed load 5_1, 5_2, 5_n of each electronic unit 2_1, 2_2, 2_n. The system 10 is arranged to:

select a pulse load pattern for the pulsed loads 5_1, 5_2, 5_n by the external control unit 8,
  select a charge control sequence by the external control unit 8,
  instruct the charge control unit by the external control unit to start the selected charge control sequence,
  start the pulse load pattern by the charge control unit,
  provide DC current from the DC power supply to each electronic unit at different times according to the selected charge control sequence set by the charge control unit.

The charge control unit thus 6_1, 6_2, 6_n receives and sets the charge control sequence from the external control unit 8 and thereby determines how DC current from the DC power supply 7 is provided to each electronic unit 2_1, 2_2, 2_n at different times according to the charge control sequence. In this way, the charge control unit 6_1, 6_2, 6_n controls how and when the regulator 3_1, 3_2, 3_n provides current to the energy storage 4_1, 4_2, 4_n. The regulator 3_1 thus controls the energy flow from the DC power supply 7 to the energy storage 4_1 and the pulsed load 5_1 and restores the voltage of the energy storage 4_1 to a regulated fixed value between the pulses. The remaining regulators in the system 10 are controlled by the respective charge control units and operate in the same way. The charge control unit 6_1, 6_2, 6_n can also control how and when the regulator 3_1, 3_2, 3_n provides current directly to the pulsed loads 5_1, 5_2, 5_n.

The energy storage 4_1, 4_2, 4_n can have a capacity that represents in excess of 100% of the current required by the pulsed load 5_1, 5_2, 5_n or have a capacity equal to or less than the current required by the pulsed load 5_1, 5_2, 5_n.

The connection between the external control unit 8 and the DC power supply 7 is not necessary. If present, the connection is used to measure and record the current supplied from the DC power supply 7. The external control unit 8 analyses the waveform and calculates a new sequence to make the current as close as possible to a pure DC.

Figure 2:
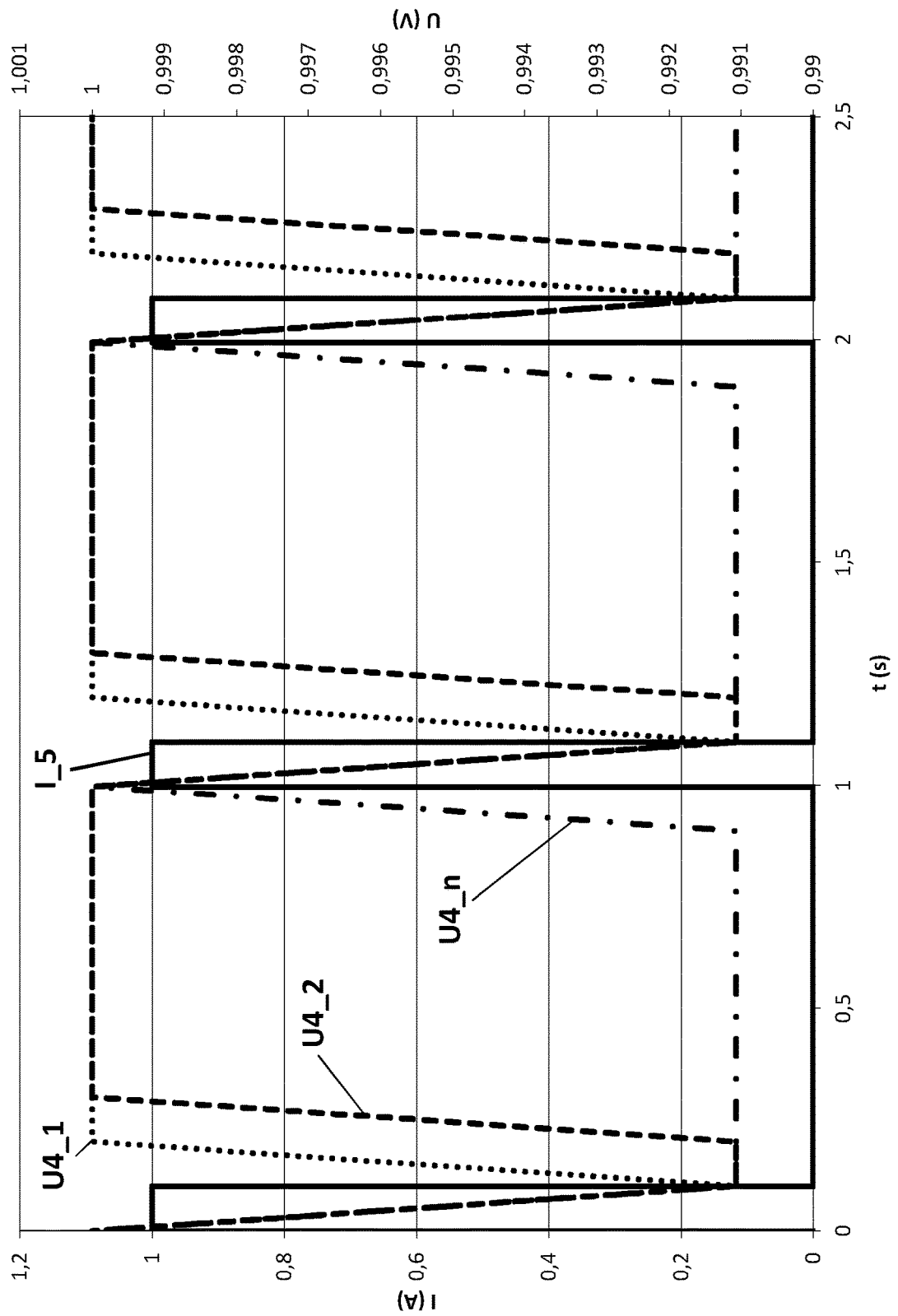

FIG. 2 schematically shows a diagram of current I and voltage U over time for a system with n electronic units. The time is illustrated as a normalised time for one pulse repetition cycle where each pulse repetition cycle is 1 second.

The current I_5 in FIG. 2 is considered to represent a typical wave form drawn from the load 5, i.e. a transmitter amplifier. The voltage U4_1 from the energy storage 4_1 of the first electronic unit 2_1 decreases linearly from the normalized voltage of 1 V to 0.9911 V during the pulse, the voltage drop being dependent on the size of the energy storage 4_1.

The energy storage 4_1 supplies the pulse energy required from the pulsed load 5_1 while maintaining a steady voltage. The size of the energy storage 4_1 is determined by the amount of charge required to keep voltage droop within acceptable limit during the time power is supplied to the pulsed load 5_1. Considering a radar power amplifier, this is in turn determined by the requirement on pulse power droop in the RF output.

The regulator 3_1 can be controlled to transfer various amount of power from the source to the energy storage 4_1 and the load 5_1 at any given time. The regulator 3_1 could for instance be programmed to be switched off during the load pulse of 5_1, and then turned on to recharge the energy storage 4_1 prior to the next load pulse. Turning on multiple regulators 3_1, 3_2, 3_n in sequence, one by one, levels out the charging currents from the DC power supply 7 over the period instead of superpositioning them.

As can be seen from FIG. 2, the recharging of each of the energy storages 4_1, 4_2, 4_n takes place during different times during the pulse repetition cycle. This is illustrated by that the increase in voltages U4_1, U4_2, U4_n are distributed over the pulse repetition cycle. There will thus be no superposition of the current needed to charge each energy storage, and the power supply can be designed to supply a lower peak current.

Recharging of the energy storage with a constant current makes the voltage increase linearly until the regulator limits the voltage to the regulation setting.

$$I = C\frac{dV}{dt}$$

This can be seen from U4_1 in FIG. 2. The absolute value for the negative and positive voltage slopes are equal, which implies that charging current equals the pulse load current.

The required charge to reset the voltage on the energy storage is the product of current and time. The time is limited to less than the time between two adjacent pulses and is determined from the current supplied from the regulator. The regulator 3_1, 3_2, 3_n can use current or voltage regulation to control the current.

Figure 5:
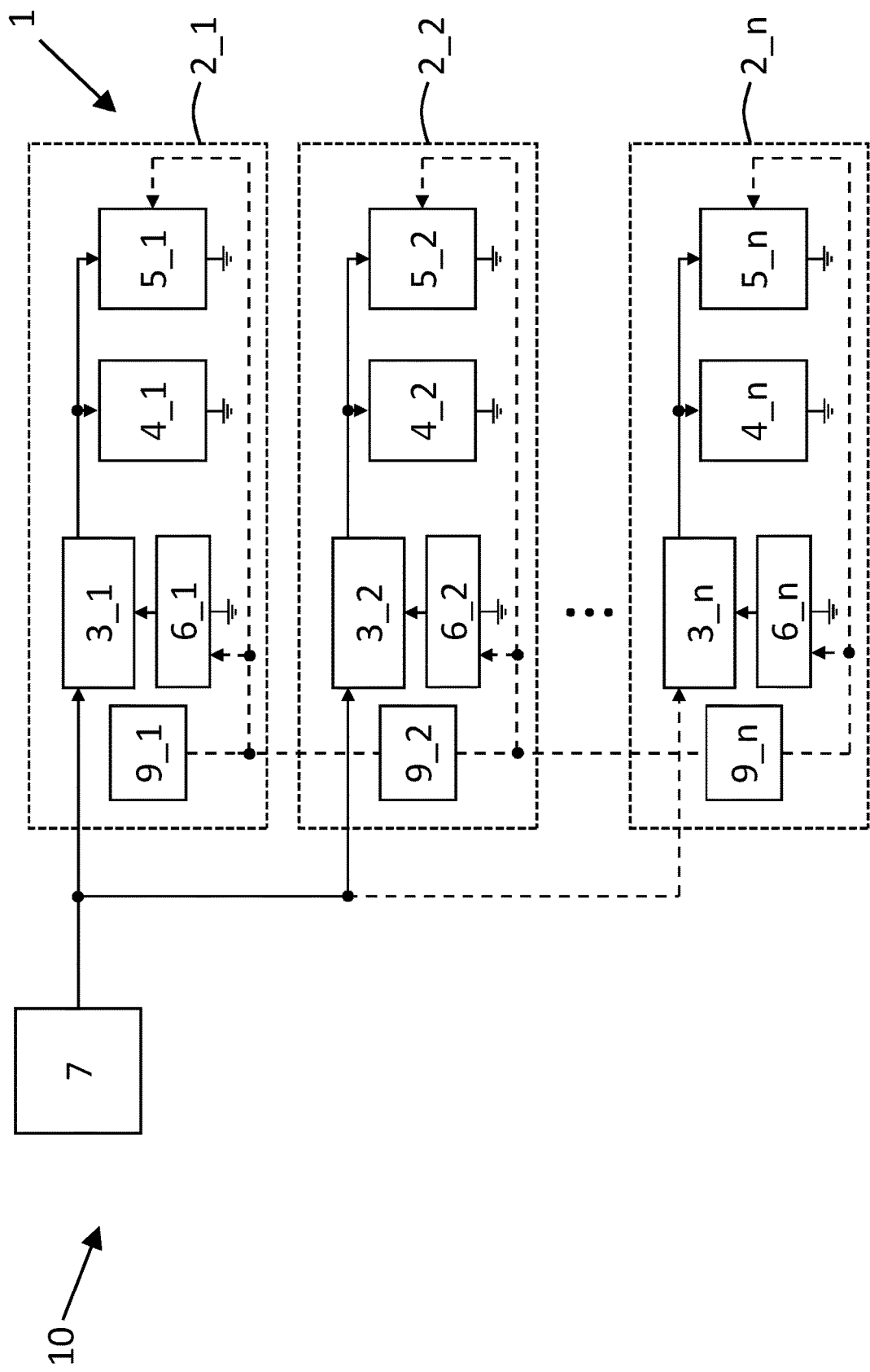

Charge control units 6_1, 6_2, 6_n control the parameters that makes the regulators 3_1, 3_2, 3_n execute the charge control sequence determined from the external control unit 8 or internal control units 9_1, 9_2, 9_n inside the electronic units 2_1, 2_2, 2_n. A system 10 with internal control units is shown in FIG. 5. Using internal control units 9_1, 9_2, 9_n requires synchronization between the electronic units 2_1, 2_2, 2_n where one is a master control unit. The sequence of control parameters for each electronic unit is selected to make up a smooth DC load on the voltage supply 7. Ideally, the relation between average current and peak current supplied is 1.

The charge control units 6_1, 6_2, 6_n may have one or several pre-programmed charge control sequences, where the external control unit 8 can select one charge control sequence depending on the pulse load pattern that is to be applied. Another possibility is that the charge control units 6_1, 6_2, 6_n can manage the regulator 3_1, 3_2, 3_n as "throttles" and apply any charge control sequence selected from the external control unit 8.

Alternatively, an adaptive method to find the best charge control sequence can be used. In this method, a default charge control sequence is applied. The current supplied from the DC power supply 7 is measured and recorded. The external control unit 8 analyses the waveform and calculates a new charge control sequence to make the current as close as possible to a pure DC. The charge control unit could include hardware only or be a microcontroller unit (MCU), a central processing unit (CPU), a field programmable gate array (FPGA) and/or be a controlled as a software.

FIGS. 3a-3d schematically show a diagram of current over time in a system comprising nine electronic units. In FIGS. 3a-3d, the number of electronic units n equals nine. All electronic units are supplied from one DC power supply 7.

Figure 3A:
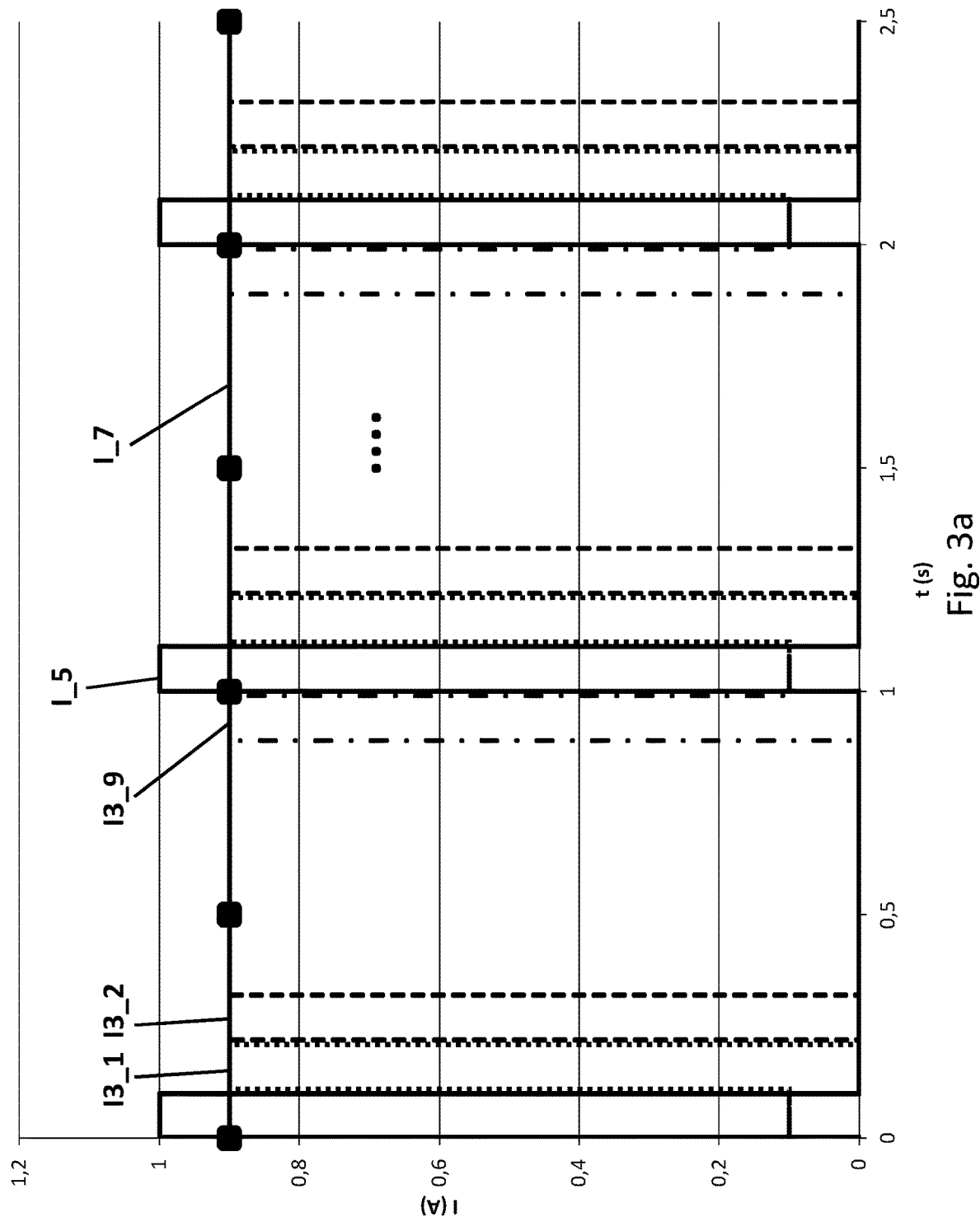

In FIG. 3a, the pulsed loads, each with current I_5 with the amplitude 1 A is turned on for 10% of the pulse cycle time, i.e. the duty cycle D is 10%. A DC power supply current I_7 is also shown together with the currents I3_1, I3_2, I3_9 supplied from each regulator 3_1, 3_2, 3_9.

Charging and supplying all nine electronic units simultaneously would results in a nine fold peak current drawn from the DC power supply 7, compared to the average current drawn by the loads 5_1, 5_2, . . . , 5_9.

The average current $I_{average}$ to each pulsed load is:

$$I_{average} = D * \hat{I}_{5\_n}.$$

where $\hat{I}_{5\_n}$ is the peak current for the nth load. The total average current supplied from the DC power supply are equal in both cases, but there is a considerate difference when comparing the average current values and peak current values for a simultaneous and distributed charging or providing current from the DC power supply to each electronic unit at different times. The peak current value is 9 times the average current value for the simultaneous charging due to superposition. The DC power supply 7 must be designed to handle both the peak and average current. As can be seen, distributed charging reduces the peak current the DC power supply must be able to provide. The DC power supply 7 can thereby be made smaller, resulting in a smaller and less expensive system.

Another aspect is impact on resistive losses in the system. According to Ohm's law, the power required during peak current can be written as $$P = R * D * \hat{I}^2.$$

The losses arise primarily in the distribution cables from the DC power supply 7. Using distributed charging provides lower losses than simultaneous charging.

Each energy storage unit can provide 100% of the current required by the pulsed load with no current being supplied from the regulator. FIG. 3a presents another aspect of the disclosure.

The pulse current I_5 is turned on for 10% of the pulse cycle time, D=10%. As can be seen from FIG. 3a, each regulator 3_1, 3_2, 3_9 is programmed to supply 1/10 of the peak load current at the same time as the load 5_1, 5_2, 5_9 is turned on. 9/10 of the peak load current is consequently supplied to the pulsed load 5_1, 5_2, 5_9 from each respective energy storage 4_1, 4_2, 4_9. With proper sequencing of the supply of peak load current, the current supply from the voltage source ideally becomes pure DC, thus making average current supplied by the source equal to peak current. The relation between average current and peak current supplied is thus ideally 1, but in reality, it is close to 1.

Figure 3B:
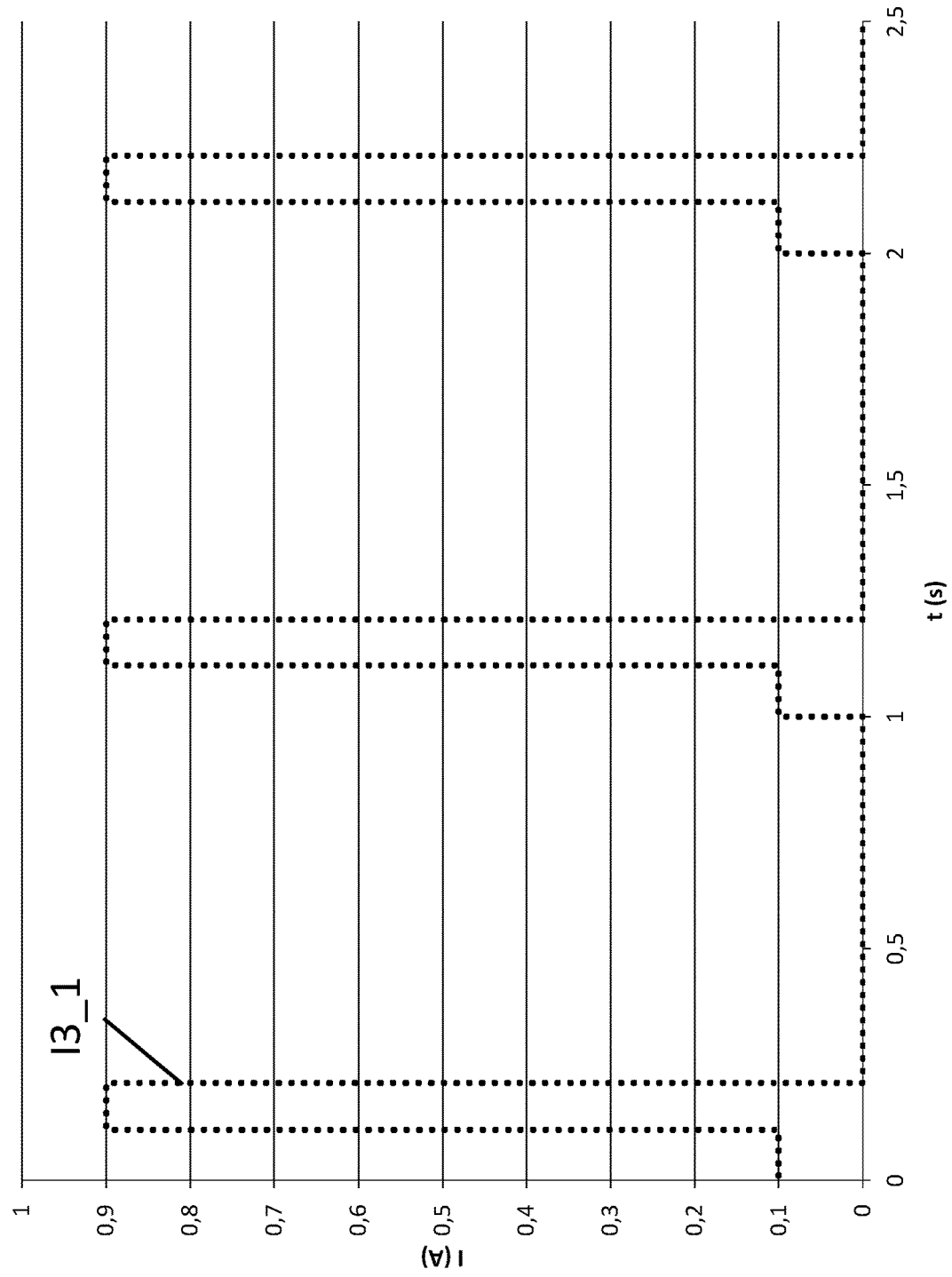
Figure 3C:
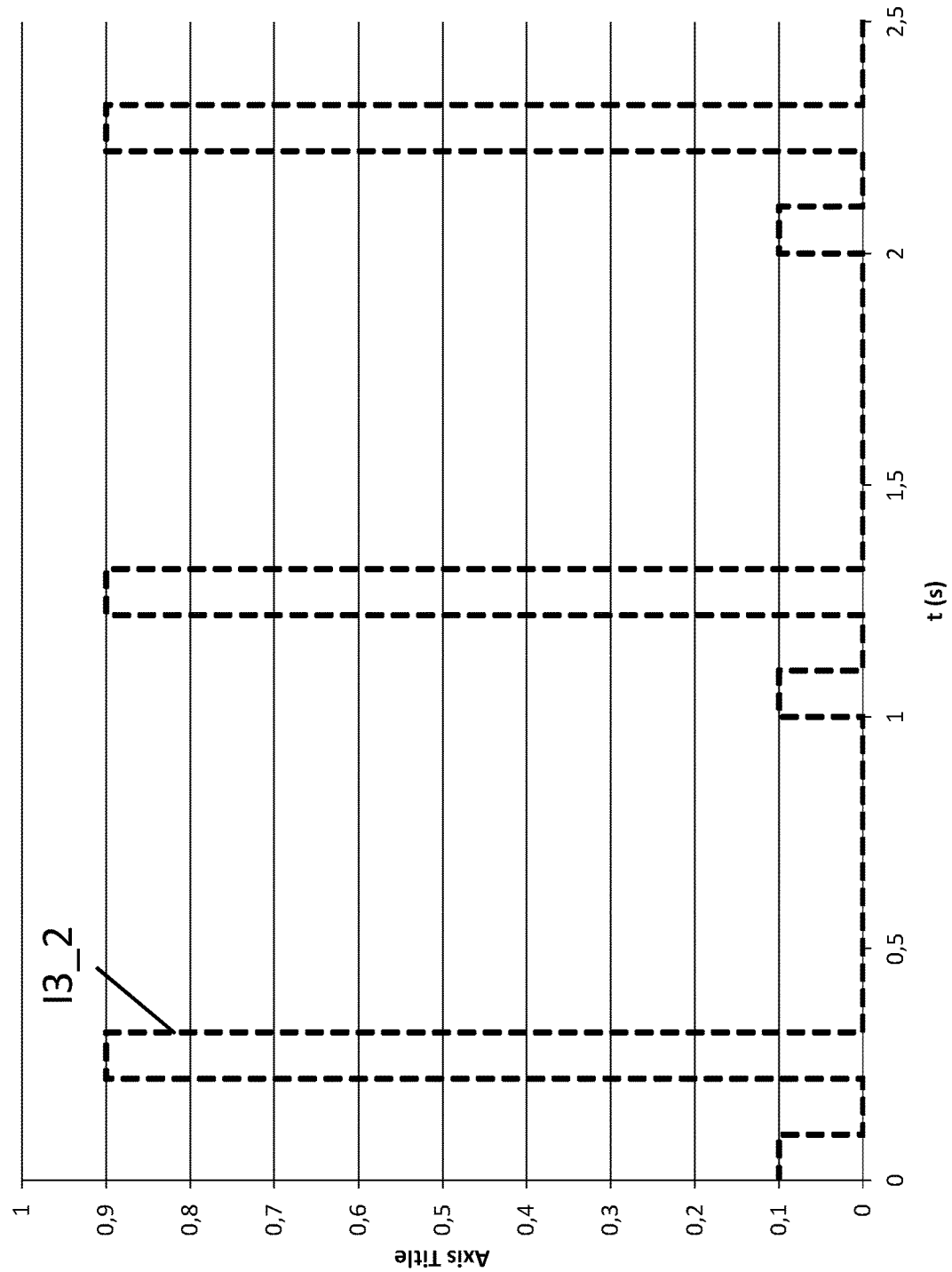
Figure 3D:
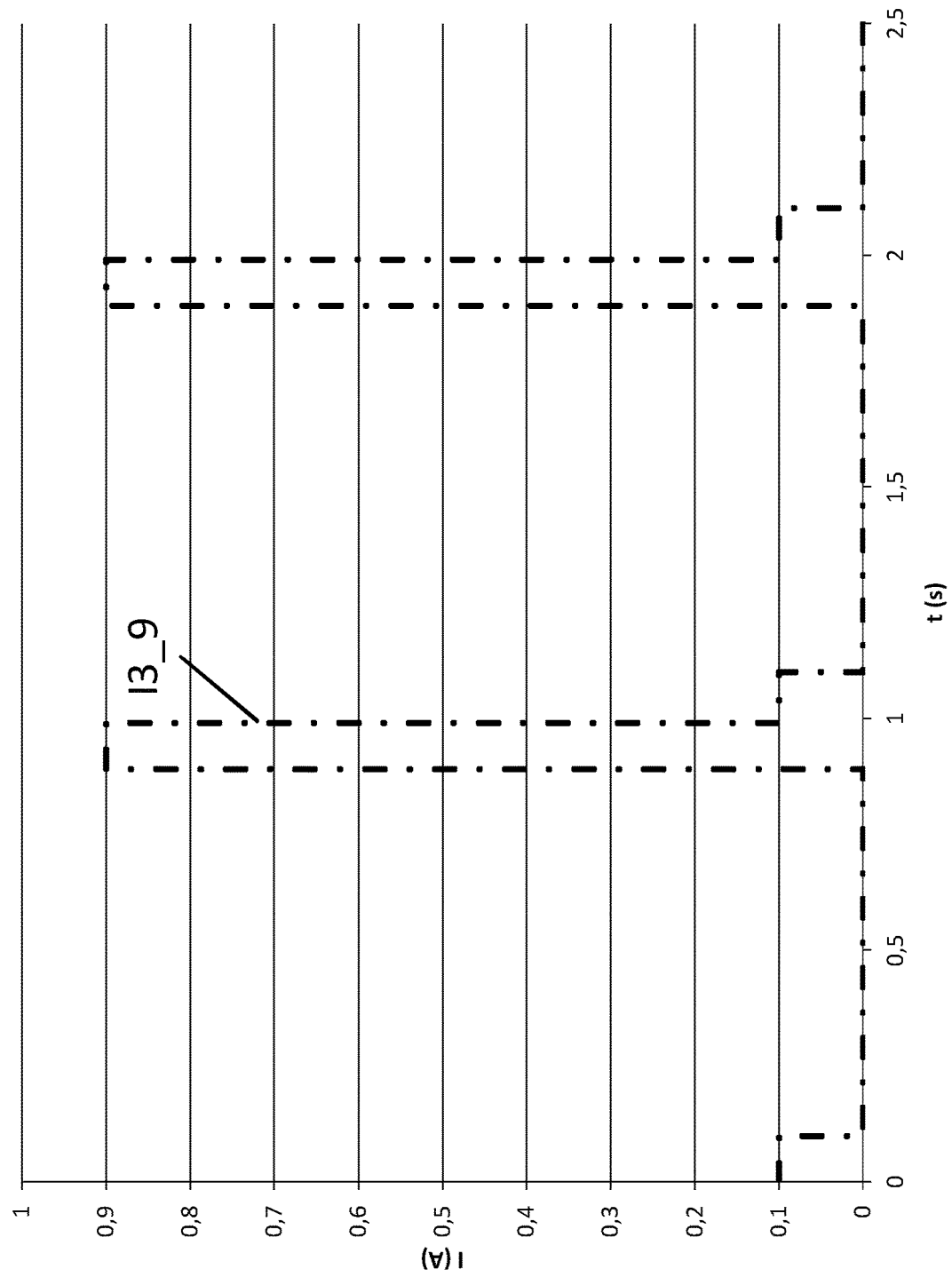

FIGS. 3b-3d schematically shows the current provided by the regulators 3_1, 3_2, 3_9 over time. As can be seen, each regulator 3_1, 3_2, 3_9 provides 1/10 of the peak load current starting at t=0 and ending at t=0.1. The first regulator 3_1 thereafter provides current to the first energy storage 4_1 corresponding to the current that was provided by it to the pulsed load between t=0.1 and t=0.2. In this example, the provided current is 0.9 A. For the second regulator 3_2 and the ninth regulator 3_9, 1/10 of the current is provided to the pulsed load between t=0 and t=0.1. The second regulator 3_2 thereafter provides current to the second energy storage 4_2 corresponding to the current that was provided by it to the pulsed load between t=0.2 and t=0.3. The ninth regulator 3_9 thereafter provides current to the ninth energy storage 4_9 corresponding to the current that was provided by it to the pulsed load between t=0.9 and t=1. At t=1, the cycle repeats. It is to be understood that the third to eighth regulators 3_3, 3_4, 3_5, 3_6, 3_7, 3_8 follows the same pattern as described above.

As can be seen, the current provided to each regulator 3_1, 3_2, 3_9 is distributed over the pulse cycle time and thereby the peak current the DC power supply 7 is required to supply is reduced.

In a practical implementation, the regulator could act as a filter, which smooths and spreads out the waveforms. Using sequencing still reduces peak currents radically. A current ripple having a repetition rate depending on how many electric loads (2) that are supplied is introduced.

Figure 4:
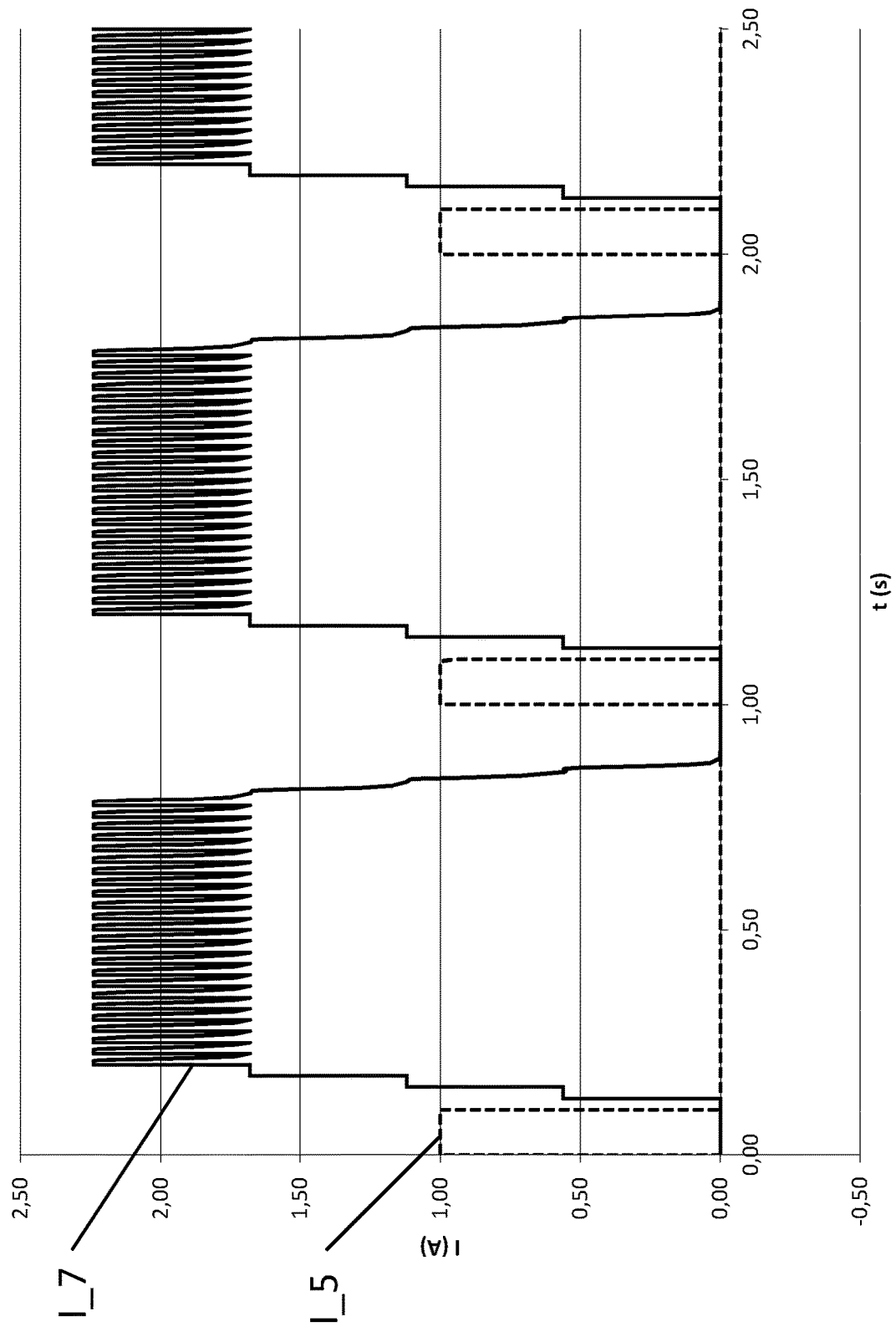

FIG. 4 schematically show a diagram of current I over time t in a system where the current supplied to each electronic unit is interleaved to fit within one pulse cycle. For pulsed loads that are operated with higher duty factors D or when larger amount of electronic units 2_1, 2_2, 2_n are supplied, the charge control sequence can be interleaved between the electronic units in order to fit a complete charge control sequence within the available pulse cycle time. The peak current is higher in this case than in the example above, but it is still considerably lower than if the charging would take place at the same time for all electronic units 2_1, 2_2, 2_n.

Linear regulators might be preferred when fast response is required and the input voltage only is slightly higher than the output voltage to keep losses sufficiently low. Switching regulators could on the other hand manage large differences between input and output voltages while still performing high power efficiencies. The regulator could also include both a switching regulator and a linear regulator.

Regulation response of the regulator needs to be fast enough to be able to change power/current flow according to settings directed from the charge control 6_1, 6_2, 6_n.

FIG. 5 schematically shows a circuit diagram for a system 10 comprising an array 1 of electronic units 2_1, 2_2, 2_n according to a second example embodiment. The circuit diagram differs from the circuit diagram of FIG. 1 in that each electronic unit 2_1, 2_2, 2_n comprises an internal control system 9_1, 9_2, 9_n. One of the internal control systems 9_1, 9_2, 9_n functions as a master control system and functions as the external control system 8 of FIG. 1.

Reference signs mentioned in the claims should not be seen as limiting the extent of the matter protected by the claims, and their sole function is to make claims easier to understand.

As will be realised, the invention is capable of modification in various obvious respects, all without departing from the scope of the appended claims. Accordingly, the drawings and the description are to be regarded as illustrative in nature, and not restrictive. For instance, the current and voltage levels provided in the above description are to be seen as illustrative examples. Current and voltage levels for real applications will be part of the design for each application.

The invention claimed is:

1. A method for providing DC current from a DC power supply to pulsed loads in an array of electronic units, wherein the array comprises at least a first and a second electronic unit, where each electronic unit comprises a regulator connected to an energy storage and a pulsed load, where the regulator is further connected to a charge control unit, where the charge control unit is arranged to control the supply of DC current to the pulsed load connected to the electronic unit, wherein the method comprises:
   selecting a pulse load pattern for the pulsed loads,
   selecting a charge control sequence by a control system connected to the electronic units and the DC power supply,
   instructing the charge control unit by the control system to start the selected charge control sequence,
   starting the pulse load pattern,
wherein the method comprises:
   synchronizing the pulsed loads in the electronic units to turn on and turn off simultaneously,
   providing DC current from the DC power supply to each electronic unit at different times according to the selected charge control sequence set by the charge control unit, the charge control unit thereby controlling how and when each regulator provides current to each energy storage.

2. The method according to claim 1, wherein the method comprises:
   providing an output voltage via the regulator to an energy storage in each electronic unit, thereby charging the energy storage,
   feeding current pulses to said pulsed loads from said energy storage and/or the regulator.

3. The method according to claim 1, wherein the method comprises:
   providing an output current via the regulator to an energy storage in each electronic unit, thereby charging the energy storage,
   feeding current pulses to said pulsed loads from said energy storage and/or the regulator.

4. The method according to claim 1, wherein the method comprises:
   selecting the charge control sequence in which each regulator is provided DC current by an external control system.

5. The method according to claim 1, wherein the method comprises:
   selecting the charge control sequence in which each regulator is provided DC current by an internal control system in each electronic unit, with one internal control system functioning as a master control system.

6. The method according to claim 4, wherein the method comprises:
   selecting a pre-programmed charge control sequence in which each regulator is provided DC current by the external or internal control system depending on the pulsed loads' current supply demand.

7. The method according to claim 4, wherein the method comprises:
   selecting a default charge control sequence in which each regulator is provided DC current by the external or internal control system depending on the pulsed loads' current supply demand,
   measuring output DC current from the DC power supply,
   analysing a waveform of the output DC current from the DC power supply by the external or internal control system,
   calculating an adapted charge control sequence in which each regulator is provided DC current with a square waveform.

8. The method according to claim 1, wherein the method comprises:
   providing DC current from the DC power supply to each electronic unit at different times according to the selected charge control sequence during one cycle time of the repetition rate for the pulsed load.

9. A system arranged to feed DC current to an array of electronic units, wherein the system comprises:
   at least a first and a second electronic unit arranged in an array,
   where each electronic unit comprises a regulator connected to an energy storage and a pulsed load,
   where the regulator is further connected to a charge control unit, where the charge control unit is arranged to provide a DC current to the pulsed load connected to the electronic unit,
   wherein the pulsed loads in the electronic units are synchronized to turn on and turn off simultaneously, that the charge control units of the first and second electronic units are arranged to provide DC current from the DC power supply to each regulator in sequence, the charge control unit thereby controlling how and when each regulator provides current to each energy storage.

10. The system according to claim 9, wherein each charge control unit is connected to an external control system arranged to select a charge control sequence in which each regulator is provided DC current.

11. The system according to claim 9, wherein each charge control unit is connected to an internal control system in each electronic unit, arranged to select the charge control sequence in which each regulator is provided DC current, with one internal control system functioning as a master control system.

12. The system according to claim 9, wherein the regulator is a linear regulator, a switching regulator with a transformer, a switching regulator without a transformer or a combination of a switching regulator and a linear regulator.

13. The system according to claim 9, configured for performing the method steps of claim 1.

14. A radar antenna arrangement comprising a system according to claim 9.

* * * * *